COLOR CATHODE RAY IMAGE REPRODUCING TUBE

Filed June 7, 1955 2 Sheets-Sheet 1

INVENTOR:
HANS HEIL,
BY Nathan J...
HIS ATTORNEY.

COLOR CATHODE RAY IMAGE REPRODUCING TUBE

Filed June 7, 1955 2 Sheets-Sheet 2

INVENTOR:
HANS HEIL,
BY Nathan J. Cornfeld
HIS ATTORNEY.

2,973,454
Patented Feb. 28, 1961

1

2,973,454

COLOR CATHODE RAY IMAGE REPRODUCING TUBE

Hans Heil, Syracuse, N.Y., assignor to General Electric Company, a corporation of New York Filed June 7, 1955, Ser. No. 513,723

23 Claims. (Cl. 315—21)

My invention relates to cathode ray tubes and pertains more particularly to new and improved means for minimizing spurious color response in color cathode ray image reproducing or picture tubes.

Color cathode ray image reproducing or picture tubes are known in which a pair of electrodes maintained at different potentials, are arranged in adjacent relation to the screen of the tube and in parallel spaced relation to each other, thereby to define an inter-electrode region or interstice. The relative potentials of the electrodes determine the electric field within the interstice and, hence, affect the trajectory of an electron beam directed toward the phosphorescent target or screen in accordance with signal intelligence.

In such color picture tubes, color response depends on the electric field between the electrodes as delineated by the configuration and spacing of the equipotential surfaces or, in other words, the surfaces of which the space potentials are constant. For the most part the equipotentials, as such surfaces are generally referred to, are uniform, that is, planar and equally spaced, throughout the major portion of the interstice; and, as a result, charged particles or electrons passing therethrough are caused to follow ideal trajectories and to strike the target or screen at ideal points for resulting in satisfactory color response. However, at the edges, and due to fringing of the electric field, the equipotentials tend to curve toward one of the electrodes or to diverge and thereby become unequally spaced or, in other words, non-uniform, thus causing electrons passing therethrough to follow trajectories displaced from the ideal trajectories and to strike the screen so as to cause unsatisfactory color response or color disturbance. I have observed that in color picture tubes wherein tri-color vertically striped target phosphors are provided, beam displacements of over four complete color cycles often occur, representing a mislocation of some 100 mils; this accounts for a color disturbance extending more than one inch in from the periphery of the screen.

In prior art color image reproducing or picture tube structures no means has been provided to correct for this fringe distortion. Instead, masking devices have generally been resorted to and positioned around the screen periphery to hide the objectionable color disturbances. The use of such masking devices is undesirable, however, since they reduce the possible usable area of the viewing portion of the screen.

My invention contemplates making more efficient use of the viewing portion or picture area of the screen by correcting for fringe effects within the tube envelope, thereby to leave a greater image area available for viewing.

Accordingly, a primary object of my invention is to provide a new and improved color cathode ray image reproducing tube.

Another object of my invention is to provide a new and improved means for maximizing the area of the viewing surface of the screen of a color image reproducing tube.

Further objects and advantages of my invention will become apparent as the following description proceeds and the features of novelty which characterize my invention will be pointed out with particularity in the claims annexed to and forming part of this specification.

2

In carrying out the objects of my invention I provide a cathode ray image reproducing tube of the type having two electrodes, one of which is adapted for being impinged by charged particles or electrons. Additionally, the electrodes are maintained at different potentials and in spaced relation, to define an inter-electrode region or interstice wherein an electric field is maintained. Also provided is means effective for so altering the normal configuration of the electric field as to cause the field to have a predetermined desired effect on all charged particles or electrons passing therethrough, thereby to determine the impingement of the electrode adapted for being impinged.

For a better understanding of my invention reference may be had to the accompanying drawing in which.

Figures 1, 3:
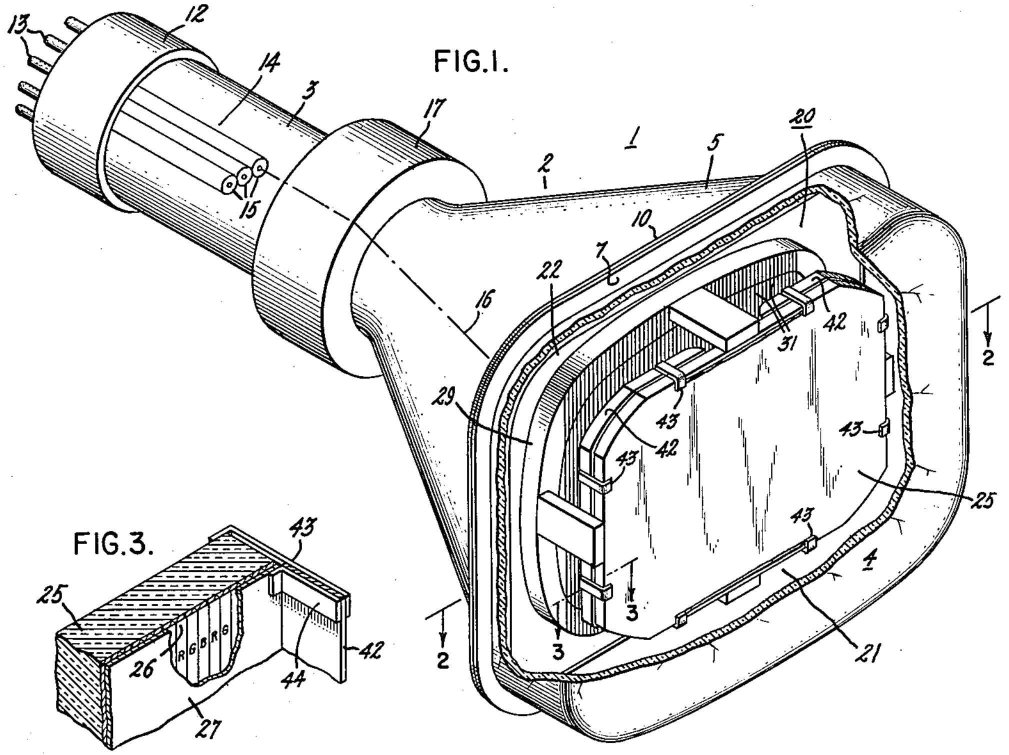
Fig. 1 is a somewhat schematic perspective illustration of a tri-color cathode ray image reproducing tube incorporating one embodiment of my invention and partially broken away to illustrate details thereof.
Fig. 3 is an enlarged fragmentary perspective view taken along the line 3—3 in Fig. 1 and looking in the direction of the arrows.

Referring to Fig. 1, I have shown a tri-color cathode ray image reproducing or picture tube 1 of the post-acceleration type and embodying a form of my invention. It is to be understood, however, that I have shown my invention in a post-acceleration structure only for purposes of illustration and that my invention is equally applicable to color image reproducing tubes of the reflecting type. It is to be understood further, that my invention is not limited to color cathode ray tubes but is applicable to any image reproducing electrode structure or the like wherein peripheral disturbances due to field fringing is encountered.

Figure 2:
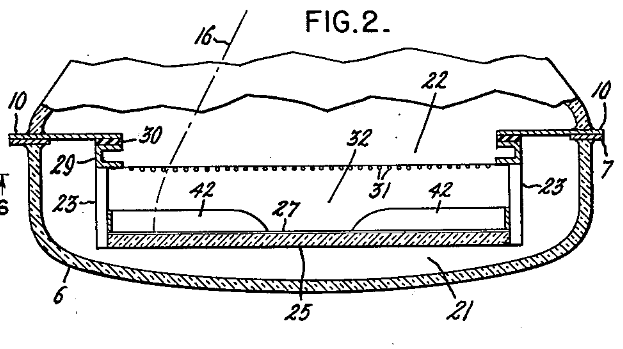
Fig. 2 is a fragmentary sectional view taken along the line 2—2 in Fig. 1 and looking in the direction of the arrows.

The tube 1 includes an evacuated envelope 2 having a cylindrical neck portion 3, a substantially rectangular face plate portion 4 and a transitional portion 5 intermediate the neck and face plate portions. As seen in Figs. 1 and 2 the face plate portion 4 may comprise the bottom of a substantially rectangular dished member 6 formed of glass or any suitable insulative transparent material.

The member 6 may have a metal flange 7 suitably sealed thereto and adapted for being secured in a sealed manner to a similar flange 10 sealed to the edge of the transitional portion 5 thereby to complete the envelope 2.

Carried on the end of the neck portion 3 is a base structure 12 including a plurality of suitably arrayed terminal pins 13 adapted for making suitable electrical connections to electrode elements mounted in the envelope.

Located in the end portion of the neck remote from the face plate 4 is charged particle or electron beam producing means generally designated 14 and adapted for emitting a plurality of beams each of which corresponds to particular color intelligence. The beam producing means 14 may comprise three electron guns 15 arranged horizontally or in any desired array and each adapted for emitting an electron beam intended to strike and light up particular color phosphors, i.e., red, green and blue.

By means not shown the beams emitted by the electron guns 15 are focused into relatively sharp beams, one of which is indicated at 16. The focused beams are deflected both vertically and horizontally by suitable deflecting means generally designated 17. Thus, the beams are caused to scan over the area of a tri-color image reproducing structure, generally designated 20, interposed between the beam producing means 14 and the face plate 4 in a position adjacent or just behind the latter.

As perhaps better seen in Fig. 2, the structure 20, comprises first and second electrode support structures 21 and 22, respectively. By means not shown these structures are rigidly maintained in predetermined spaced relation by a plurality of insulative spacers 23 suitably arranged about the peripheries thereof.

The first electrode support structure 21 includes a transparent plate or screen 25 formed of glass or any suitable material. As seen in Fig. 3, the plate 25 is provided with a layer of phosphorescent material 26 on the surface thereof remote from the face plate 4 of the envelope. The phosphorescent material 26 preferably comprises red, green and blue light producing phosphors deposited or arranged on the screen in repeated triads of vertical red, green and blue phosphor stripes in the manner illustrated exaggeratedly in Fig. 3. In other types of color image reproducing tubes the phosphors may be arranged symmetrically in triangular arrays, in horizontal stripes or in some other pattern. Provided over the layer of phosphorescent material 26 is a conductive layer 27 which constitutes the first electrode and will hereinafter be referred to as the first electrode 27.

As seen with reference to Fig. 2 also, the second electrode support structure 22 includes a conductive frame 29 suitably secured to the flange 10 and insulated therefrom by suitable insulative members 30. With the phosphorescent material 26 arranged in vertical stripes in the manner shown in Fig. 3, the second electrode support structure 22 preferably further includes a plurality of substantially closely spaced parallel, and vertically extending wires 31 secured in a conductive manner across the frame 29. The wires 31 comprise collectively the second electrode and will hereinafter be referred to as the second electrode 31. It will be understood that with different phosphor patterns, such as triangular arrays or horizontal stripes, the second electrode may be any suitable similar form of structure which is permeable to electrons or charged particles, such as an apertured mask or an arrangement including horizontally extending wires, respectively.

In the structure 20 the first electrode 26 is adapted for being maintained at a potential higher than that of the second electrode 31, thereby to set up and maintain an electric field in the inter-electrode region or interstice defined by the electrodes and designated 32. During the operation of the tube 1 the electrons comprising the beams emitted from the guns 15, including the beam 16, are admitted into the inter-electrode region 32 through the spaces between the wires 31 and travel through this region for striking or impinging the phosphor material 26. In the inter-electrode region 32 the higher potential of the conductive layer or first electrode 27 is effective for attracting and thereby accelerating the movement of the electrons comprising the beams toward the screen thereby to increase the striking force of the electrons on the phosphorescent material 26 whereby the color brightness is increased. The second electrode 31 serves properly to focus the electron beams entering the inter-electrode region 32 and to direct them onto the strips of different color phosphorescent material.

Now the configuration of the path of travel or trajectory of the electrons comprising a beam, such as 16, in the inter-electrode region 32 is dependent upon the configuration and spacing of the equipotentials in that region. That is, an electron beam entering the inter-electrode region, in the manner of the beam 16 in Fig. 2, normally tends gradually to align itself perpendicular to the equipotentials, and as a result the electrons making up the beam traverse a path which may be described as a segment of a parabola. In the major area of the inter-electrode region 32 the equipotentials are uniform or substantially equally spaced and parallel. Thus, in this area the trajectories of the electrons of all the beams are such that the beams all strike the screen at ideal or true striking points which are substantially equally laterally spaced. As a result, no difficulty of locating the various phosphor stripes and accurate reproduction of the color intelligence is encountered across the major area of the screen, at least insofar as field considerations play a part in determining the reproduction of such color intelligence.

However, in the peripheral areas of the inter-electrode region 32 there is usually a disturbance in the field symmetry or non-uniformity of the equipotentials due to curving of the end portions of the equipotentials about the electrodes. Disturbance or non-uniformity of the field also occurs in tube structures wherein structural elements protrude into the inter-electrode region.

As a result of the non-uniformity of the portion of the equipotentials or field lines in the peripheral portions of the region 32, the electron beams extending therethrough and under the discipline thereof are displaced laterally from the ideal or desired striking points which would be the points struck by the beams if the equipotentials were uniform throughout the inter-electrode region. This displacement of the beams may be inwardly or outwardly depending on the relative areas of the electrodes defining the inter-electrode region; and in either case sometimes results in color impurities or disturbances extending more than one inch in from the periphery of the screen or first electrode 21. These disturbances reduce the viewing area of the screen and, therefore, it is desirable to minimize them rather than merely mask them out.

In accordance with my invention the electric field in the peripheral areas of the inter-electrode region 32 is altered such as to cause the electron beams passing therethrough to impinge upon or strike the screen at the ideal or true striking points.

In Figs. 1–3 is illustrated a form of my invention particularly adapted for correcting or minimizing the color disturbance due to fringing encountered when vertical phosphor stripes are employed and when, for manufacturing purposes or any other reason, the image reproducing structure 20 is constructed symmetrically and includes a second electrode 31 which extends laterally beyond each side edge of the first electrode 27.

Figure 4:
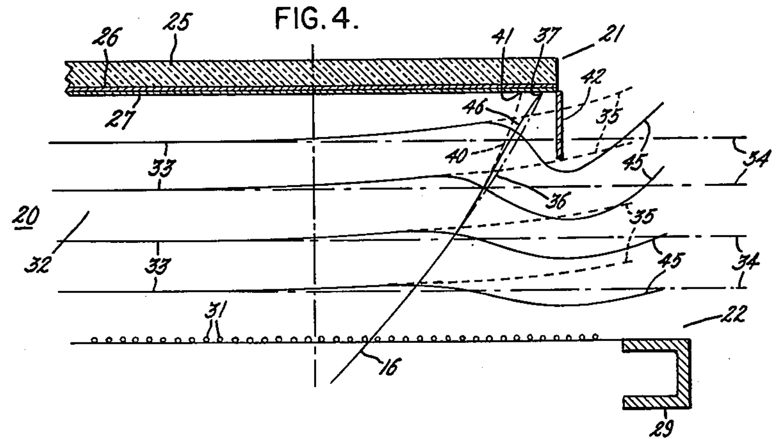
Fig. 4 is an enlarged fragmentary diagrammatic illustration of the operation of the embodiment of Fig. 1.

In the structure shown in Figs. 1–3, and as illustrated diagrammatically in Fig. 4, the equipotentials designated 33 in the inter-electrode region 32 are substantially uniform or parallel and equally spaced across the major portion of the region and electron beams extending therethrough, or the electrons comprising such beams, are caused to impinge or strike the screen at desired or ideal striking points which correspond to desired color stripes. This results in satisfactory color response. In the peripheral portions of the region 32, however, the equipotentials normally do not extend uniform in the manner shown in dot and dash lines 34 but instead tend to curve toward the plane of the first electrode in the manner shown in dash lines designated 35.

Now, if the equipotentials extended uniformly in the peripheral portions of the inter-electrode region 32, as at 34, an electron beam entering this region, such as 16, would be caused to follow a path or trajectory substantially as shown in dot and dash lines 36 and would strike the screen at an ideal point designated 37. This would result in the impingement and lighting of a desired color stripe. With the potential lines curved, as at 35, the beam 16 would be directed along a trajectory substantially as shown in dash lines 40 and would strike the screen at a point designated 41 displaced inwardly from the ideal point 37. With the phosphorescent material 26 laid in triads of vertical stripes on the screen 25, this inward displacement of the beam may be more than four complete triads and result in a color disturbance extending more than an inch in from the screen periphery.

As now will be described in detail, my invention as applied to the just-described type of image reproducing structure provides for the introduction of a potential source adapted for affecting or distorting the fringing field in such a manner as to cause the beam 16 to travel a trajectory whereby it will strike the ideal point 37 just as though it had traveled through a uniform portion of the field in the inter-electrode region 32. In the particular form of my invention illustrated in Figs. 1–4 the potential source is provided by electrode means comprising a pair of skirt members 42 mounted on the first electrode support structure 21. The skirt members 42 are each formed of a suitable conductive material such as stainless steel and are bent to extend along the side edges of the screen and inwardly toward the center of the screen along the upper and lower edges thereof. Alternatively, a skirt member comprising a continuous strip extending completely around the periphery of the screen may be utilized. Additionally, the skirt members 42 extend toward the second electrode 31 a predetermined distance short of the second electrode.

The skirt members are suitably secured to the screen by a plurality of spaced clips 43. The clips 43 are formed of a conductive material and include a portion 44, best seen in Fig. 3, which is adapted for making contact with the conductive coating or first electrode 27 on the screen. Thus, the skirt members 42 are adapted for being maintained at the same potential as the first electrode 27 and are rendered effective by setting up their own fields for altering or distorting the electric field in the peripheral portion of the inter-electrode region 32. This alteration results in bending or distortion of the portions of the equipotentials in the peripheral area from the dash line positions 35 to the solid line positions designated 45 in Fig. 4. With the equipotentials so bent the beam 16 is caused to follow the solid line trajectory designated 46, and thereby strike the screen at the ideal point 37, just as though it has passed through a uniform field. This results in restored color purity and insures accurate reproduction of the color intelligence or images being received.

Figure 5:
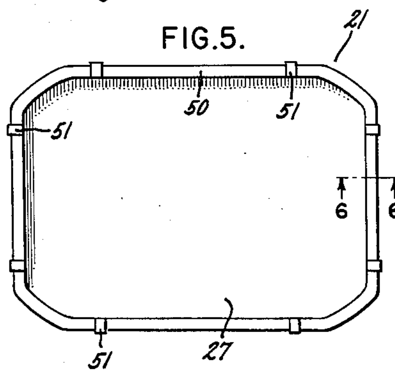
Fig. 5 is a plan view of a modified form of my invention.
Figure 6:
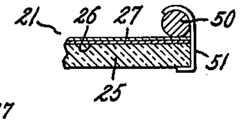
Fig. 6 is an enlarged fragmentary sectional view taken along the line 6—6 in Fig. 5 and looking in the direction of the arrows.

In Figs. 5 and 6 is illustrated a modified form of my invention wherein the electrode means adapted for providing a potential source in the vicinity of the edge of the screen 21 comprises a rod-like member 50. The member 50 is preferably bent to conform to the marginal configuration of the screen 21 and is suitably secured to the edge of the screen in contact with the first electrode 27 by a plurality of clips 51 or the like. Thus, the member 50 is adapted for correcting for fringing and thereby minimizing peripheral screen disturbances in the same manner as the skirt members 42, as illustrated in Fig. 4. It will be understood that the member 50 can have substantially any cross-sectional configuration. For instance, it may be semi-circular in cross-section with the flat side thereof held in contact with the coating 27. Additionally, the member 50 need not extend completely about the edge of the screen 21. That is, the member 50 could be divided into two portions each substantially identical in configuration to the skirt members 42 in Fig. 1.

Figure 7:
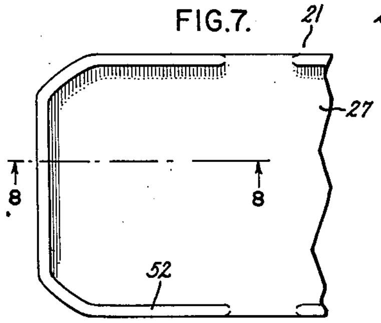
Fig. 7 is a fragmentary plan view illustrating another modified form of my invention.
Figure 8:
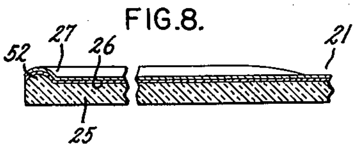
Fig. 8 is a fragmentary sectional view taken along the line 8—8 in Fig. 7 and looking in the direction of the arrows.

In Figs. 7 and 8 is illustrated another modified form of my invention wherein the electrode means adapted for providing a potential source in the vicinity of the edge of the screen 21 is integrally formed with the screen. As clearly seen in Fig. 8 the plate 25 may be formed with marginal ridges 52 which extend toward the second electrode 31 along the side edges and along the top and bottom edges of the screen toward the center thereof. These ridges may meet at the center thereby to provide a circuitous marginal ridge or may blend into the surface of the plate 25 short of the center line, in the manner shown in Figs. 7 and 8. The ridges 52 are adapted for having the conductive layer or first electrode 27 continue thereover from the surface of the plate 25. Thus, the ridges are adapted for being maintained at the same potential as the screen and the ridges 52 are thereby adapted for correcting field fringing in substantially the same manner as the skirt members 42, as illustrated in Fig. 4. It will be understood that while I have shown the ridges 52 as integral portions of the plate 25 they may comprise separately formed members which may be suitably secured to the marginal portions of the plate for having the conductive layer 27 extend thereover.

Figure 9:
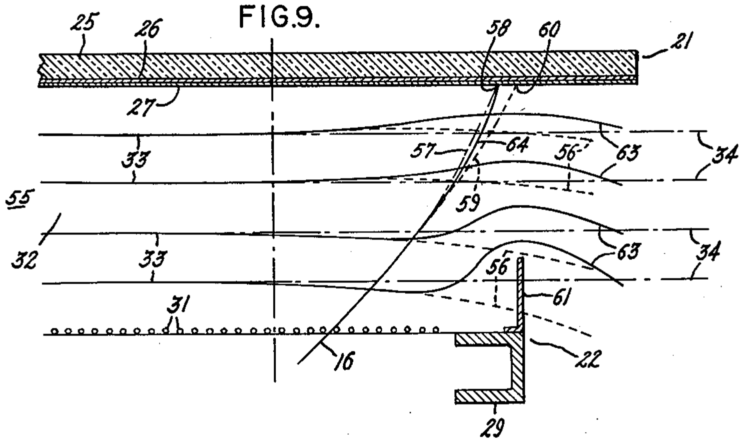
Fig. 9 is an enlarged fragmentary diagrammatic illustration of the operation of another embodiment of my invention.

Illustrated diagrammatically in Fig. 9 is an image reproducing structure generally designated 55 incorporating my invention and wherein my invention is effective in correcting for the particular type of fringe disturbance generally encountered where the electrodes are asymmetrical and the first electrode 27 extends laterally beyond the side edges of the second electrode 31. In an electrode structure such as that just described and illustrated in Fig. 9, the portions of the equipotentials 33 in the peripheral portions of the inter-electrode region 32 do not extend uniformly in the manner shown in dot and dash lines 34 but instead tend to curve toward the plane of the shorter electrode 31, in the manner shown in dash lines 56. If the equipotentials extend uniformly along 34 a beam 16 entering the inter-electrode region 32 at the peripheral portions thereof would be caused to follow a trajectory shown in dot and dash lines and designated 57 for striking the screen 21 at an ideal point 58 to light up a desired color stripe. With the potential lines curved along the dash lines 56 the beam 16 would be directed along a trajectory substantially as shown in dash lines designated 59 and would strike the screen at a point 60 displaced outwardly from the ideal point 58. This would result in substantial color disturbance or impurity in the peripheral area of the screen. In order to correct for this I have provided a potential source in the vicinity of the side edges of the second electrode 31. This potential source may comprise electrode elements 61 mounted on the side edges of the frame 29 supporting the second electrode 31 and suitably electrically connected thereto for assuming the same potential as the electrode 31. The electrode elements 61 may comprise a pair of skirt members such as the members 42 in Fig. 1, a member similar to the rod-like member 50 in Fig. 5, or they may be integrally formed with the frame 29 substantially in the same manner as the ridges 52 are formed on the plate 25 in Fig. 7. The electrode element 61, by setting up and maintaining its own electric field, is effective for bending or distorting the equipotentials to the positions thereof shown in solid lines designated 63 in Fig. 9. With the equipotentials bent into the positions thereof designated 63, the beam 16 is caused to follow the solid line trajectory 64 and thereby strike the ideal point 58. Thus, the electrons which would ordinarily strike undesired color phosphors stripes and create color disturbance are caused to strike the desired stripes and thereby effect satisfactory color response.

Figure 10:
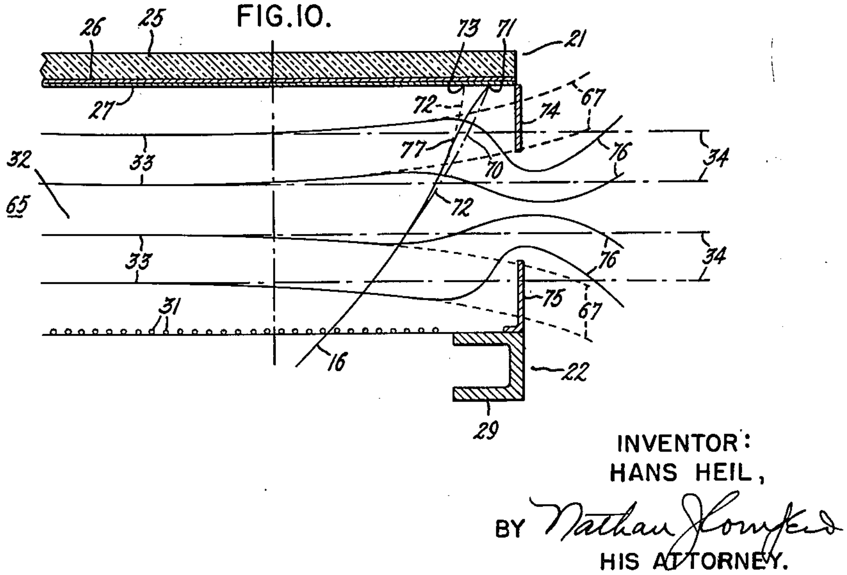
Fig. 10 is an enlarged fragmentary diagrammatic illustration of still another embodiment of my invention.

Fig. 10 diagrammatically illustrates my invention as applicable to the correction of peripheral color disturbances resulting normally in a symmetrical image reproducing structure 65 wherein the first and second electrodes 27 and 31, respectively, are substantially identical in configuration with the result that the side edges thereof are substantially aligned. In such a structure and without my invention applied thereto the portions of the equipotentials 33 in the peripheral area of the inter-electrode region 32 do not extend uniformly along the dot and dash lines 34 but instead tend to flare outwardly in the manner indicated by the dash lines designated 67. In this structure if the equipotentials did extend uniformly along the lines 34 the beam 16 would follow the dot and dash line trajectory designated 70 for striking an ideal point 71 on the screen 21 and result in satisfactory color response. With the equipotentials flaring and assuming the dash line positions 67, the beam 16 would be caused to travel the dash line trajectory 72 and thereby strike a point 73 displaced inwardly from the desired point 71. This would result in color disturbance in the peripheral area of the screen in a manner somewhat similar to that discussed above with regard to Fig. 4.

In order to correct for the above-described color disturbance in the structure 65 I have provided potential sources in the vicinity of the lateral edges of both the first electrode 27 and the second electrode 31. These potential sources may comprise a pair of electrode elements 74 which may be substantially identical to the members 42 illustrated in Fig. 4, the rod-like member 50 in Fig. 5 or the conductive ridges 52 in Fig. 7. The potential source at the edge of the second electrode 31 may comprise a pair of electrode elements 75 which may be substantially identical in construction to the elements 61, one of which is shown in Fig. 9. Additionally, these elements may be substituted for by an element similar in construction to the element 50 in Fig. 5, or electrode elements integrally formed on the frame 29 in much the same manner as the ridges 52 on the plate 25 may be alternatively employed.

The members 74 and 75 are maintained at potentials corresponding to the electrodes 27 and 31, respectively, and thereby set up and maintain their own electric fields. The fields about these elements are effective for altering the electric field in the peripheral portion of the inter-electrode region 32, which alternation results in bending or distortion of the equipotentials in the peripheral area from the dash line positions 67 to the solid line positions designated 76. With the equipotentials bent in the manner illustrated by the solid lines 76, the beam 16 is caused to follow the solid line trajectory 77 for thereby striking the screen at the ideal or desired point 71 in much the same manner as though the beam had passed through a uniform field. Thus, color purity is restored and accurate reproduction of the color intelligence is insured.

Thus, it will be seen that I have provided a new and improved color cathode ray image reproducing or picture tube wherein the viewing surface of the screen of the tube is maximized and the fidelity of the video response is improved. It will be seen further that while I have shown and described my invention in arrangements adapted for reducing color impurities encountered in color tube structures wherein the phosphors are arranged in vertical stripes on the screen and the color disturbance results primarily at the side edge portions, my invention is equally applicable for reducing color disturbance resulting from fringing in any type of electrode structure and at any portion thereof. That is, if the color phosphor stripes and the wires 32 of the second electrode were all arranged horizontally and color disturbance due to fringing was encountered at the upper and lower edges of the screen while that at the side edges was almost negligible, my invention would be applicable to correct for the disturbance since the potential source provided by the electrode elements could be appropriately disposed for distorting the fringe field and thereby correcting the disturbance in much the same manner as illustrated in Figs. 4, 9 and 10.

Additionally, my invention is equally effective for correcting peripheral disturbances encountered in electrode structures wherein the phosphors are arranged in triangular arrays or the like and an apertured mask is employed. In this type of structure, also, the disturbance may be minimized by appropriately disposing the electrode elements for distorting the fringe field all in accordance with my invention.

It will also be seen that my invention is adapted for altering the normal trajectories of charged particles for reasons other than the correction of color disturbances. For example, in the manufacture of color picture tubes it is sometimes expeditious to print the different color phosphor stripes or other phosphor configurations in a manner which would result in apparent disturbance when the stripes are impinged by charged particles passing through uniform potentials. In color tubes having the different color phosphors printed in this manner my invention is applicable for distorting the normally uniform equipotentials for altering the normal trajectories of the charged particles and thereby causing them to impinge desired phosphors.

While I have shown and described specific embodiments of my invention, I do not desire my invention to be limited to the particular forms shown and described, and I intend by the appended claims to cover all modifications within the spirit and scope of my invention.

What I claim as new and desire to secure by Letters Patent of the United States is:

1. An image reproducing structure for a cathode ray tube comprising; a pair of spaced electrodes including one adapted for being impinged by charged particles, said electrodes being adapted for maintaining an electric field therebetween to affect the travel of charged particles impinging upon said one electrode, and means between the electrodes effective for altering non-uniform portions of said field to adapt said non-uniform portions for having substantially the same ultimate effect on the travel of said charged particles therethrough as a uniform portion of said field.

2. An image reproducing structure for a cathode ray tube comprising; a pair of spaced electrodes including one adapted for being impinged by charged particles, said electrodes being adapted for maintaining an electric field therebetween to affect the travel of charged particles impinging upon said one electrode, said electric field normally including a substantially uniform central portion effective for causing charged particles passing therethrough to impinge said one electrode at desired points, said field normally further including non-uniform portions tending to cause charged particles passing therethrough to impinge said one electrode at points other than said desired points, and a potential source disposed between said electrodes in the vicinity of the periphery of said pair of electrodes altering said electric field to cause substantially all charged particles passing therethrough to impinge said one electrode at said desired points.

3. An image reproducing structure for a cathode ray tube comprising; a pair of spaced electrodes one of which is adapted for being impinged by electrons, said electrodes being adapted for maintaining an electric field to affect the travel of said electrons, said field normally including a substantially uniform central portion and fringing peripheral portions, and means between said pair of electrodes and located in the vicinity of the periphery of said pair of electrodes effective for distorting said fringing portions of said field to adapt said fringing portions for having substantially the same ultimate effect on said electrons as said uniform central portion of said field.

4. An image reproducing structure for a cathode ray tube comprising; a pair of spaced electrodes one of which is adapted for being impinged by electrons, said electrodes being adapted for maintaining an electric field to affect the travel of said electrons, said field normally including a substantially uniform central portion and fringing peripheral portions, and means between said pair of electrodes providing a potential source in the vicinity of the periphery of said pair of electrodes effective for distorting said fringing portions of said field to adapt said fringing portions for having substantially the same ultimate effect on said electrons as said uniform central portion of said field.

5. An image reproducing structure for a cathode ray tube comprising; a pair of spaced electrode members one of which is adapted for being impinged by charged particles, said members being maintained at predetermined different electric potentials for maintaining an electric field to affect the travel of said charged particles toward said one member, said field normally including a substantially uniform central portion and fringing peripheral portions, and electrode means between said pair of electrode members mounted in the vicinity of the edge of at least one of said members, said electrode means being maintained at an electric potential whereat it is effective for distorting the fringing portions of said field to adapt said fringing portions for having substantially the same ultimate effect on the travel of said charged particles as said uniform central portion of said field.

6. An image reproducing structure for a cathode ray tube comprising; a pair of spaced planar electrode members, one of said members being permeable to charged particles, the other of said members having a phosphorescent material coating adapted for being impinged by said charged particles, said members being maintained at predetermined different electric potentials for maintaining an electric field to affect the travel of said charged particles toward said phosphorescent material, said field normally including a substantially uniform central portion and fringing peripheral portions, and electrode means between said pair of spaced electrode members mounted in the vicinity of the edges of at least one of said members, said electrode means being maintained at an electric potential whereat it is effective for distorting and thereby adapting the fringing portions of said field for having substantially the same ultimate effect on the travel of said charged particles as said uniform central portion of said field.

7. A post-acceleration image reproducing structure for a cathode ray tube comprising; a pair of spaced planar electrode members one of which is permeable to charged particles, the other of said members having a phosphorescent material coating adapted for being impinged by charged particles permeating said one member, said members being maintained at predetermined different electric potentials for maintaining an electric field effective for accelerating charged particles permeating said one member toward said phosphorescent material, said field normally including a substantially uniform central portion and fringing peripheral portions, and electrode means between said pair of spaced electrode members mounted in the vicinity of the edges of at least one of said members, said electrode means being maintained at an electric potential whereat said electrode means is effective for distorting and thereby adapting the fringing portions of said field for having the same ultimate effect on said charged particles as said uniform central portion of said field.

8. A post-acceleration image reproducing structure for a color cathode ray tube comprising; a pair of spaced planar electrode members, one of said members being permeable to electrons, the other of said members having a coating comprising a plurality of arrays of different color phosphorescent material adapted for being impinged by electrons permeating said one member thereby to effect color response, said members being maintained at different electric potentials for maintaining an electric field effective for accelerating electrons permeating said one member toward said phosphorescent material and determining the points of impingement thereof, said field normally including a substantially uniform central portion whereby electrons are caused to impinge said phosphorescent material at desired points for effecting satisfactory color response, said field normally further including fringing peripheral portions whereby electrons are caused to impinge said phosphorescent material at points displaced from said desired points thereby to effect unsatisfactory color response, and electrode means between said pair of spaced electrode members mounted in the vicinity of the edges of at least one of said members for distorting the fringing portions of said field to adapt said fringing portions for causing electrons passing therethrough to impinge said phosphorescent material at said desired points thereby to correct for said unsatisfactory color response.

9. A post-acceleration image reproducing structure for a color cathode ray tube comprising; a pair of spaced asymmetric planar electrode members, the larger of said members being permeable to electrons, the smaller of said members having a coating comprising a plurality of arrays of different color phosphorescent material adapted for being impinged by electrons thereby to effect color response, said members being maintained at predetermined different electric potentials for maintaining an electric field effective for accelerating electrons permeating said larger electrode toward said phosphorescent material and determining the impingement thereof, said field normally including a substantially uniform central portion whereby electrons are caused to impinge said phosphorescent material at desired points for effecting satisfactory color response, said field normally further including fringing peripheral portions whereby electrons are displaced inwardly from said desired points thereby to effect unsatisfactory color response, and electrode means mounted in the vicinity of the edges of said smaller member, said electrode means being maintained at an electric potential whereat it is effective for distorting the fringing portions of said field to adapt said fringing portions for causing electrons passing therethrough to impinge said phosphorescent material at said desired points thereby to correct for said unsatisfactory color response.

10. A post-acceleration image reproducing structure for a color cathode ray tube comprising; a pair of spaced asymmetric planar electrode members, the smaller of said members being permeable to electrons, the larger of said members having a coating comprising a plurality of arrays of different color phosphorescent material adapted for being impinged by said electrons thereby to effect color response, said members being maintained at predetermined different electric potentials for maintaining an electric field effective for accelerating electrons permeating said smaller member toward said phosphorescent material and determining the impingement thereof, said field normally including a substantially uniform central portion whereby said electrons are caused to impinge said phosphorescent material at desired points for effecting satisfactory color response, said field normally further including peripheral portions whereby electrons passing therethrough are displaced outwardly from said desired points thereby to effect unsatisfactory color response, and electrode means mounted in the vicinity of the edges of said smaller member, said electrode means being maintained at an electrical potential whereat it is effective for distorting the fringing portions of said field to adapt said fringing portions for causing electrons passng therethrough to impinge said phosphorescent material at said desired points thereby to correct for said unsatisfactory color response.

11. A post-acceleration image reproducing structure for a color cathode ray tube comprising; a pair of spaced symmetrical planar electrode members, one of said members being permeable to electron beams, the other of said members having a coating comprising a plurality of arrays of different color phosphorescent material adapted for being impinged by electrons thereby to effect color response, said members being maintained at predetermined different electrode potentials maintaining an electric field effective for accelerating electrons permeating said one member toward said phosphorescent material and determining the impingement thereof, said field normally including a substantially uniform central portion whereby electrons are caused to impinge said phosphorescent material at desired points for effecting satisfactory color response, said field normally further including fringing peripheral portions whereby electrons passing therethrough are caused to impinge said phosphorescent material at points outwardly displaced from said desired points thereby to effect unsatisfactory color response, and electrode means extending into said field from the edges of each of said members, said electrode means being maintained at electrical potentials whereat it is effective for distorting the fringing portions of said field to adapt said fringing portions for causing electrons passing therethrough to impinge said phosphorescent material at said desired points thereby to correct for said unsatisfactory color response.

12. A post-acceleration image reproducing structure for a color cathode ray tube comprising; a pair of spaced planar electrode members, one of said members comprising a plurality of spaced substantially parallel coplanar wires adapted for being permeable to charged particles, the other of said members having a coating comprising a plurality of stripes of different phosphorescent material extending substantially parallel to said wires and adapted for being impinged by charged particles thereby to effect color response, said members being maintained at predetermined different electric potentials for maintaining an electric field effective for accelerating charged particles permeating said one electrode toward said phosphorescent material and determining the impingement thereof, said field normally including a substantially uniform central portion whereby charged particles are caused to impinge said phosphorescent material at desired stripes for effecting satisfactory color response, said field normally further including fringing peripheral portions whereby charged particles passing therethrough are caused to impinge undesired stripes thereby to effect unsatisfactory color response, and a potential source between said spaced electrode members including an elongated portion extending parallel to said wires in the vicinity of the edges of at least one of said members effective for distorting the fringing portions of said field to adapt said fringing portions for causing charged particles passing therethrough to impinge said desired stripes thereby to correct for said unsatisfactory color response.

13. A post-acceleration image reproducing structure for a color cathode ray tube comprising; a pair of spaced asymmetric planar electrode members, the larger of said members comprising a plurality of spaced substantially parallel coplanar wires adapted for being permeable to electrons, the smaller of said members having a coating comprising a plurality of stripes of different phosphorescent material extending substantially parallel to said wires and adapted for being impinged by electrons thereby to effect color response, said members being maintained at predetermined different electric potentials for maintaining an electric field effective for accelerating electrons permeating said larger electrode toward said phosphorescent material and determining the impingement thereof, said field normally including a substantially uniform central portion whereby said electrons are caused to impinge said phosphorescent material at desired stripes for effecting satisfactory color response, said field normally further including fringing peripheral portions whereby electrons passing therethrough are caused to impinge stripes displaced inwardly from said desired stripes thereby to effect unsatisfactory color response, and electrode means mounted in the vicinity of the edges of the smaller of said members, said electrode means being maintained at the potential of said smaller member whereat it is effective for distorting the fringing portions of said field to adapt said fringing portions for causing electrons passing therethrough to impinge said desired stripes thereby to correct for said unsatisfactory color response.

14. A post-acceleration image reproducing structure for a color cathode ray tube comprising; a pair of spaced asymmetric planar electrode members, the smaller of said members comprising a plurality of spaced substantially parallel coplanar wires adapted for being permeable to electrons the larger of said members having a coating comprising a plurality of stripes of different phosphorescent material extending substantially parallel to said wires and adapted for being impinged by electrons thereby to effect color response, said members being maintained at predetermined different electric potentials for maintaining an electric field effective for accelerating electrons permeating said smaller member toward said phosphorescent material and determining the impingement thereof, said field normally including a substantially uniform central portion whereby said electrons are caused to impinge said phosphorescent material at desired stripes for effecting satisfactory color response, said field normally further including fringing peripheral portions whereby electrons passing therethrough are caused to impinge stripes displaced outwardly from said desired stripes thereby to effect unsatisfactory color response, and an electrode element extending into said field from an edge portion of said smaller member, said electrode element being maintained at the potential of said smaller member whereat it is effective for distorting said fringing portions of said field to adapt said fringing portions for causing electrons passing therethrough to impinge said desired stripes thereby to correct for said unsatisfactory color response.

15. A post-acceleration image reproducing structure for a color cathode ray tube comprising; a pair of spaced symmetric planar electrode members, one of said members comprising a plurality of spaced substantially parallel coplanar wires adapted for being permeable to electrons, the other of said members having a coating comprising a plurality of stripes of different phosphorescent material extending substantially parallel to said wires and adapted for being impinged by electrons thereby to effect color response, said members being maintained at predetermined different electric potentials for maintaining an electric field effective for accelerating electrons permeating said one member toward said phosphorescent material and determining the impingement thereof, said field normally including a substantially uniform central portion whereby electrons are caused to impinge said phosphorescent material at desired color stripes for effecting satisfactory color response, said field normally further including fringing peripheral portions whereby electrons passing therethrough are caused to impinge color stripes displaced outwardly from said desired stripes thereby to effect unsatisfactory color response, and an electrode element extending into said electric field from edge portions of each of said members, said electrode elements including portions extending parallel to said wires and being maintained at the potential of the respective members whereat said electrode means are effective for distorting the fringing portions of said field to adapt said fringing portions for causing electrons passing therethrough to impinge said desired stripes thereby to correct for said unsatisfactory color response.

16. A cathode ray image reproducing tube comprising; an envelope, a pair of spaced electrodes in said envelope, means in said envelope directing charged particles toward one of said electrodes, said electrodes being adapted for maintaining an electric field to affect the travel of said particles toward said one electrode, and means between said electrodes altering the normal configuration of said field for adapting said field to affect the travel of all charged particles passing therethrough in a substantially uniform manner.

17. A cathode ray image reproducing tube comprising; an envelope, a pair of spaced electrodes in said envelope, one of said electrodes being adapted for being impinged by charged particles, means in said envelope directing charged particles toward said one electrode, said electrodes being adapted for maintaining an electric field to affect the travel of said particles toward said one electrode, said field normally including a substantially uniform central portion effective for causing charged particles passing therethrough to impinge said one electrode at desired points, said field normally including fringing portions tending to cause charged particles passing therethrough to impinge said one electrode at points other than said desired points, and a potential source between said electrodes disposed in said envelope in the vicinity of the periphery of said pair of electrodes altering said electric field to cause substantially all charged particles passing therethrough to impinge said one electrode at said desired points.

18. A cathode ray image reproducing tube comprising; an envelope, a pair of spaced electrodes in said envelope, one of said electrodes being adapted for being impinged by electrons, beam producing means in said envelope directing beams of electrons toward said one electrode, said electrodes being adapted for setting up and maintaining an electric field to affect the travel of electrons toward said one electrode, said field normally including a substantially uniform central portion effective for causing electrons passing therethrough to impinge said one electrode at desired points, said field normally further including peripheral fringing portions tending to cause electrons passing therethrough to impinge said one electrode at points displaced from said desired points, and means between said electrodes in said envelope effective for distorting the fringing portion of said field to adapt said fringing portion for causing electrons passing therethrough to impinge said one electrode at said desired points.

19. A cathode ray image tube reproducing tube comprising; an image reproducing electrode in said envelope including a coating of phosphorescent material adapted for being impinged by electrons, electron beam producing means in said envelope directing a plurality of electron beams toward said image reproducing electrode, an electron permeable electrode interposed in said envelope between said image reproducing electrode and said beam producing means, said electrodes being maintained at predetermined different potentials to effect an electric field for accelerating toward said image reproducing electrode electrons permeating said electron permeable electrode and determining the impingement of said phosphorescent material, said field normally including a substantially uniform central portion whereby said electrons are caused to impinge said phosphorescent material at desired points, said field normally further including fringing peripheral portions tending to cause electrons passing therethrough to impinge said phosphorescent material at points displaced from said desired points, and a potential source between said electrodes disposed in said envelope in the vicinity of the edges of at least one of said electrodes effective for distorting the fringing portions of said field to adapt said fringing portions for causing electrons passing therethrough to impinge said phophorescent material at said desired points.

20. A color cathode ray image reproducing tube comprising; an envelope, an image reproducing electrode in said envelope having a coating comprising a plurality of arrays of different color phosphorescent material adapted for being impinged by electrons, electron beam producing means in said envelope effective for directing a plurality of electron beams toward said phosphorescent material to effect color response, an electron permeable electrode interposed in said envelope between said image reproducing electrode and said beam producing means, said electrodes being maintained at predetermined different potentials to effect an electric field for accelerating toward said image reproducing electrode electrons permeating said electron permeable electrode and determining the impingement of said phosphorescent material by said electrons, said field normally including a substantially uniform central portion whereby said electrons are caused to impinge said phosphorescent material at desired points for effecting satisfactory color response, said field normally further including fringing peripheral portions tending to cause electrons passing therethrough to impinge said phosphorescent material at points displaced from said desired points thereby to effect unsatisfactory color response, and electrode means between said electrodes mounted in said envelope in the vicinity of at least one of said image reproducing and electron permeable electrodes, said electrode means being maintained at an electric potential whereat said electrode means is effective for distorting the fringing portions of said field to adapt said fringing portions for causing electrons passing therethrough to impinge said phosphorescent material at said desired points thereby to correct for said unsatisfactory color response.

21. A color cathode ray image reproducing tube comprising; a planar image reproducing electrode in said envelope including a coating of phosphorescent material comprising a plurality of stripes of different color phosphorescent material adapted for being impinged by electrons, electron beam producing means in said envelope effective for directing a plurality of electron beams toward said phosphorescent material to effect color response, a second planar electrode interposed in said envelope between said image reproducing electrode and said beam producing means comprising a plurality of spaced substantially parallel coplanar wires adapted for being permeable to electrons and extending substantially parallel to said stripes of phosphorescent material, said planar electrodes being maintained at predetermined different potentials for setting up an electric field effective for accelerating electrons permeating said second electrode and determining the impingement of said phosphorescent material, said field normally including a substantially uniform central portion whereby electrons passing therethrough are caused to impinge said phosphorescent material at desired color stripes for effecting satisfactory color response, said field normally further including fringing peripheral portions tending to cause electrons passing therethrough to impinge color stripes displaced from said desired stripes thereby to effect unsatisfactory color response, and an electrode element in said envelope including a portion extending parallel to said wires between said electrodes in the immediate vicinity of at least one of said planar electrodes and maintained at a potential effective for distorting said fringing portions of said field to adapt said fringing portions for causing electrons passing therethrough to impinge said desired color stripes thereby to correct for said unsatisfactory color response.

22. An image reproducing structure for a cathode ray tube comprising; a pair of spaced electrodes including one carrying a plurality of parallel stripes of phosphorescent material adapted for being impinged by charged particles, said electrodes being adapted for maintaining an electric field therebetween to affect the travel of charged particles impinging upon said stripes, and a conductive element between said electrodes including an elongated portion extending parallel to said stripes extending into said field from the edge of one of said electrodes, said conductive element being effective for distorting the normal configuration of the peripheral portions of said field to determine the impingement of said stripes.

23. A cathode ray image reproducing tube comprising; an envelope, a pair of spaced electrodes in said envelope including one carrying a plurality of parallel stripes of phosphorescent material, means in said envelope directing charged particles toward said stripes, said electrodes being adapted for maintaining an electric field therebetween to affect the travel of said charged particles toward said stripes, and a conductive element between said electrodes including an elongated portion extending parallel to said stripes extending into said electric field from the edge of one of said elements, said conductive element being effective for distorting the normal configuration of the peripheral portions of said field to adapt said field for affecting the travel of all charged particles passing therethrough in a substantially uniform manner.

References Cited in the file of this patent

UNITED STATES PATENTS

| | | |
|---|---|---|
| Re. 23,672 | Okolicsanyi | June 23, 1953 |
| 2,206,387 | Bruche | July 2, 1940 |
| 2,227,003 | Schlesinger | Dec. 31, 1940 |
| 2,497,660 | Devine | Feb. 14, 1950 |
| 2,691,116 | Allwine | Oct. 5, 1954 |
| 2,692,532 | Lawrence | Oct. 26, 1954 |
| 2,695,372 | Lawrence | Nov. 23, 1954 |
| 2,722,623 | Law | Nov. 1, 1955 |
| 2,728,872 | Smith | Dec. 27, 1955 |